United States Patent [19]

Beytes et al.

[11] Patent Number: 5,067,324
[45] Date of Patent: Nov. 26, 1991

[54] ENGINE NOZZLE LINER RETAINER

[75] Inventors: Deane Beytes, Tequesta; Erik A. Lindstrom, Palm Beach Gardens, both of Fla.

[73] Assignee: United Technologies Corporation, Hartford, Conn.

[21] Appl. No.: 504,230

[22] Filed: Apr. 4, 1990

[51] Int. Cl.$^5$ .............................................. F02C 1/00
[52] U.S. Cl. ......................................... 60/752; 60/271
[58] Field of Search .............. 60/752, 753, 39.31, 60/39.32, 271; 403/340, 364; 431/350, 352, 353

[56] References Cited

U.S. PATENT DOCUMENTS

| H528 | 10/1988 | Bruchez et al. | 60/753 |
|---|---|---|---|
| 1,158,307 | 10/1915 | Schmidt | 403/340 |
| 2,544,538 | 3/1951 | Mahnken et al. | 60/752 |
| 3,253,842 | 5/1966 | Rabe | 403/364 |
| 3,462,181 | 8/1969 | Lewis | 403/364 |
| 4,471,623 | 9/1984 | Griffin | 60/39.31 |
| 4,620,447 | 11/1986 | Kimball | 403/364 |
| 4,840,026 | 6/1989 | Nash et al. | 60/271 |
| 4,848,089 | 7/1989 | Cramer | 60/752 |
| 4,854,122 | 8/1989 | Belling | 60/752 |
| 4,944,151 | 7/1990 | Hovnanian | 60/39.32 |

FOREIGN PATENT DOCUMENTS

| 892890 | 4/1962 | United Kingdom | 60/752 |
|---|---|---|---|

*Primary Examiner*—Richard A. Bertsch
*Assistant Examiner*—Timothy S. Thorpe
*Attorney, Agent, or Firm*—Edward L. Kochey, Jr.

[57] ABSTRACT

A nozzle liner (14) is secured to a nozzle support structure (10) with interlocking clips (24, 26). After moving the liner axially into engagement cantilever spring (32) abuts a clip (24) which retains the liner. The liner is easily installed, spring engagement may be confirmed, and the liner is readily removable.

5 Claims, 3 Drawing Sheets

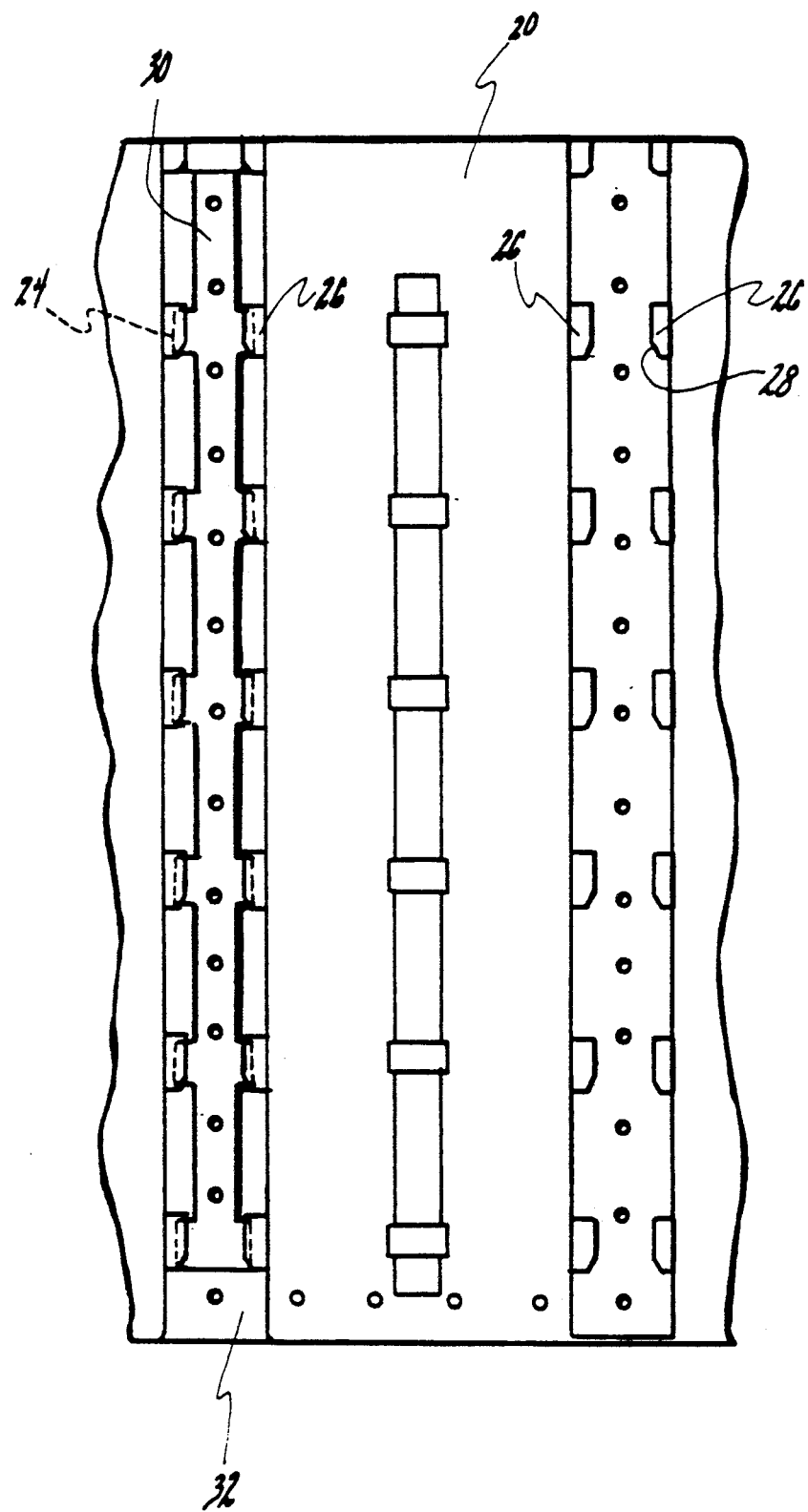

ENGINE NOZZLE LINER RETAINER

The Government has rights in this invention pursuant to a contract awarded by the Department of the Air Force.

TECHNICAL FIELD

The invention relates to nozzles carrying high temperature gas and in particular to retention of a liner therein.

BACKGROUND OF THE INVENTION

Nozzles of gas turbine engines carry extremely hot exhaust gas. It is therefore necessary to provide liners which protect the underlying structure. These liners are conventionally air cooled, usually with an impingement plate located adjacent the liners with cooling air passing through holes in the impingement plate and impinging against the liner. Such airflow then passes out through the aft end of the liner convectively cooling hot surfaces as it traverses aft.

These liners must furthermore be supported in such a way as to permit expansion relative to the support structure because of the temperature differential.

Even with the appropriate cooling construction these liners still deteriorate and must be replaced. Previous methods of retaining the liners produce difficult installation and replacement problems.

Fasteners previously used required welding. They also frequently required covering of the fasteners. This tended to lead to disturbances of the aerodynamic contour. They were also very difficult to remove for replacement of the liner.

SUMMARY OF THE INVENTION

The liner to be held against the impingement plate is a flexible liner with a plurality of arcuate portions and an axially extending linear portion between the arcuate portions.

On the linear portion there are a plurality of clips which interact with engageable clips on the impingement plate. These are sized and spaced such that the liner may be placed over the impingement plate axially misaligned with the clips passing by each other at that point, and with the liner being slid axially with all the clips in engagement. The liner must then be axially restrained.

A fixed stop, preferably on the impingement plate engages one side of a clip which is on the liner. A second side of this clip is engaged with a depressible spring preferably also located on the impingement plate. This is preferably a cantilever spring with the edge in abutment with the clip.

The closable opening is provided in the liner adjacent the spring which permits inspection to determine that the spring is engaged, and also permits access for removal. This opening is preferably closed with a rivet to eliminate air leakage.

It is also preferable that both the stop and the spring operate on the same clip whereby expansion of the liner may take place away from the two holding points. This permits relatively close tolerance on the clearance at the spring and stop locations.

BRIEF DESCRIPTION OF THE DRAWINGS

FIG. 2 is a top view showing a relative position of the clip portions;

DESCRIPTION OF THE PREFERRED EMBODIMENT

Figure 1:
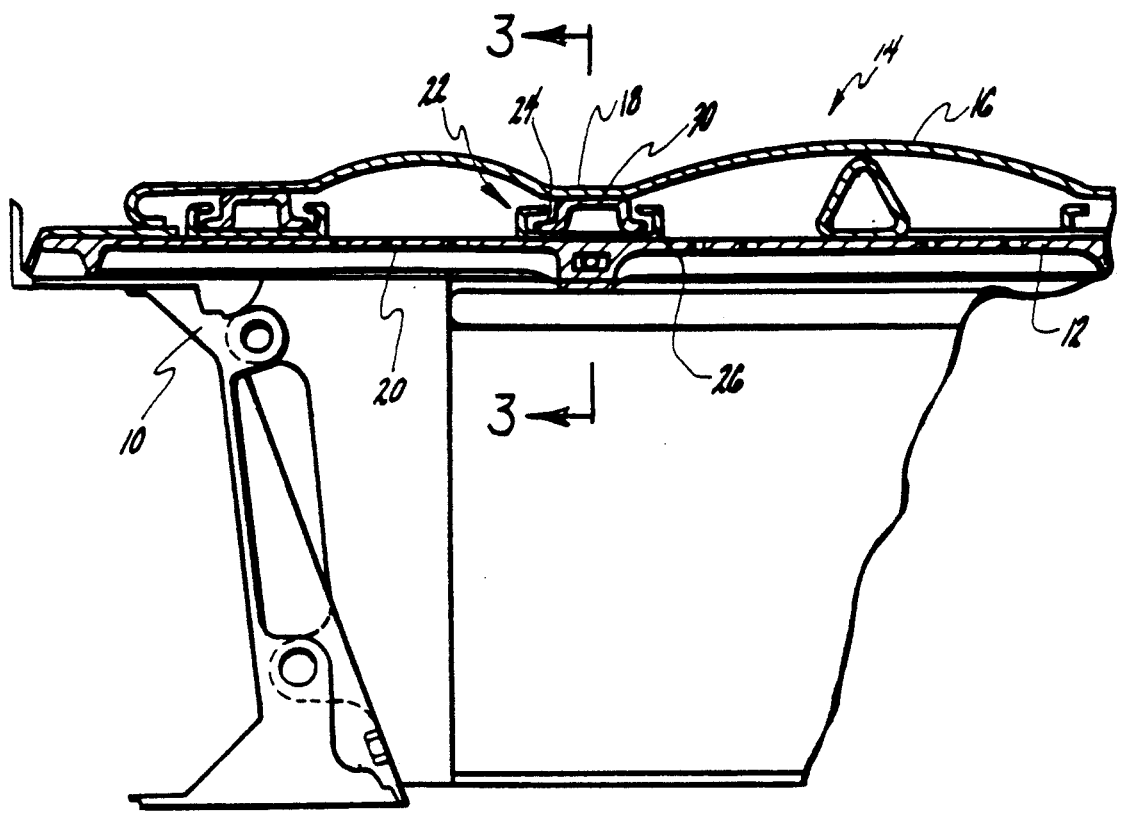
FIG. 1 is a section showing a liner, the impingement plate and the clips.

Referring to FIG. 1 there is shown a nozzle support structure 10 with a planar impingement plate 12. Liner 14 has a plurality of arcuate sections 16 with axially extending linear portions 18 located between the arcuate portions. Airflow openings 20 located in the impingement plate direct cooling air against the liner 16 with this air convectively cooling the liner as it passes aft and out the end.

Interlocking clip pairs 22 are each comprised of a first clip 24 located on the linear portion of the liner and a second clip 26 located on the impingement plate. FIG. 2 is a top view of the assembly with liner 16 removed. Clips 24 secured to the liner are, however, shown in one portion of the drawing to illustrate their relationship to clips 26. Clips 26 located on impingement plate 20 are spaced and have a tapered edge 28 to facilitate assembly with clips 24. A flat bar 30 extends substantially the length of the liner with clips 24 extending therefrom at spaced locations. These clips 24 engage corresponding clips 26 as shown. For installation the clips (24 and 26) are placed out of engagement, the surface is pressed together, and the liner slid axially for engagement as shown. Cantilever spring 32 retains the liner in position as described in more detail hereinafter. It is noted, however, that this retainer spring 32 need not be located with every bar 30 and preferably is at two or three locations.

Figure 3:
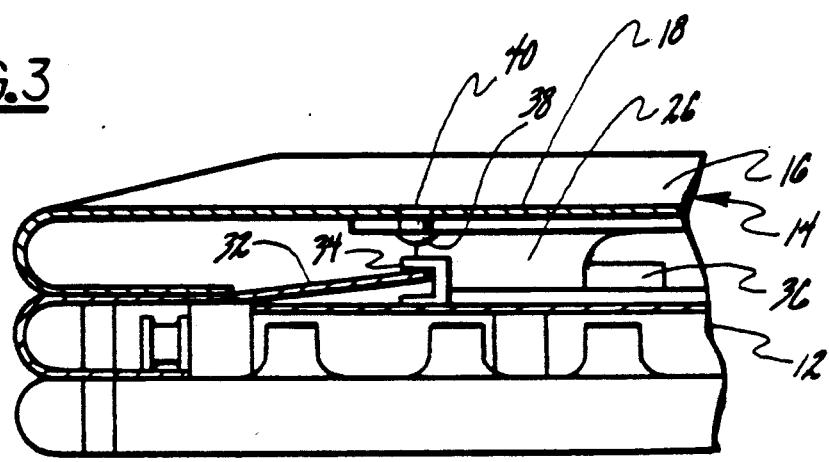
FIG. 3 is a side view of the liner retainer.

Referring to FIG. 3 an optional spring travel retainer 34 is shown. This limits the travel of the spring beyond its uncompressed condition as shown and the fully required depressed condition against the impingement plate. The travel limiter 34 must be located at such a point that it does not interfere with axial travel of clip 24 on liner 14.

The liner 14 is placed with the clips (24 and 26) out of engagement as described above and slid into place. Clip 24 engages stop 36 located on impingement plate 12 which limits and retains axial motion in a first direction. Spring 32 which has been depressed below clip 24 for initial installation springs upwardly and abuts the end of clip 24 to prevent axial travel in the other direction. This functions to retain the liner against axial movement while the opposite end of the liner is free to expand as required.

An opening 38 in the liner permits inspection to determine that the spring is released and engaged. It also provides access for depressing the spring for later disassembly and removal of the liner. A rivet 40 or any other appropriate closing means may be used to close this hole against air leakage during operation.

Figure 4:
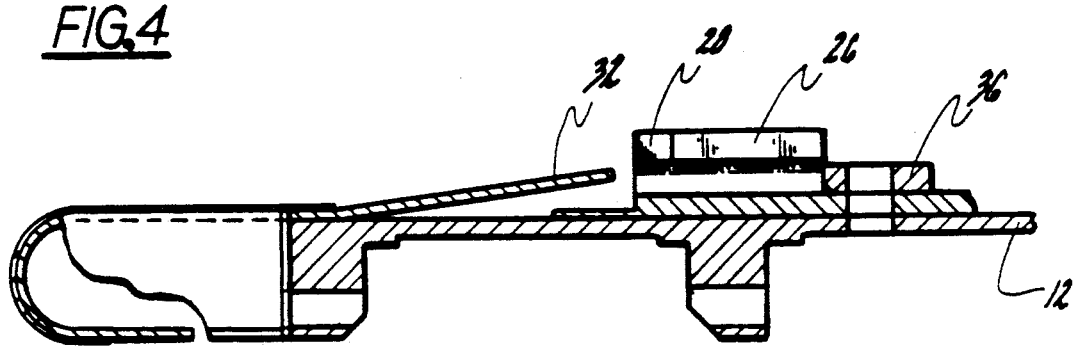
FIG. 4 is a section through the retainer without the liner.

FIG. 4 illustrates in more detail the spring arrangement with the liner omitted. Clip 26 secured to liner 12 can be seen with the leading edge 28 tapered. The spring travel retainer is omitted in this view. Stop 36 is brazed, and may be bolted to the planar impingement plate 12.

Figure 5:
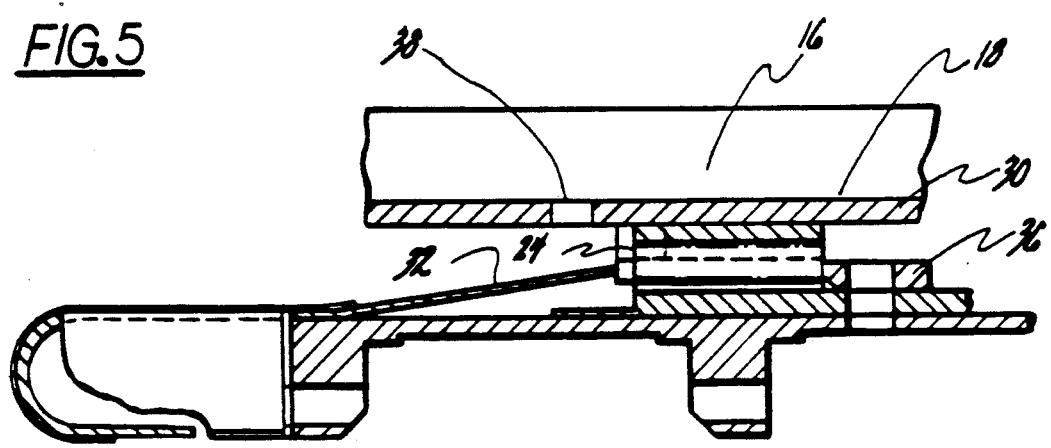
FIG. 5 is a section through the retainer with the liner.

FIG. 5 is similar to FIG. 4, but illustrates the liner in place with clip 24 abutting stop 36. Spring 32 abuts or is closely spaced from clip 24. The clearance between the spring and the clip 24 plus the clearance between the clip 24 and the stop is nominally on the order of 0.030 inches (0.762 mm). Access opening 38 is shown in the liner.

Thus, there is provided an apparatus for retaining the liner wherein the liner is easy to install and also easy to remove when required. There is no interference with either the cooling airflow or the gas flow passing through the nozzle. It eliminates access cover plates and eliminates welding and fitting. It provides a means for inspecting for positive engagement of the stop.

We claim:

1. A liner retaining arrangement for retaining a nozzle liner against a nozzle wall comprising:
   a flexible liner having a plurality of arcuate sections and axially extending linear portions located between said arcuate portions;
   a planar impingement plate;
   a plurality of axially slideable interlocking clip pairs, a first clip of each pair secured to said linear portion and a second clip of each pair secured to said impingement plate, said clip pairs each having a length and spacing between pairs such that said liner may be placed with said clip pairs clearing each other and axially slid into engagement;
   at least one axial retaining structure comprising;
   a fixed stop in one of said liner and impingement plate abutable with a clip on the other of said liner and impingement plate in a first direction;
   a depressible spring on one of said liner and impingement plate abutable with a clip on the other of said liner and impingement plate on the second direction when the spring is in its undepressed condition, but not when it is in its depressed condition.

2. An apparatus as in claim 1:
   said spring secured to said impingement plate, abutting a clip on said liner.

3. An apparatus as in claim 2:
   said spring comprising a substantially axially extending cantilever spring having the edge in contact with said clip.

4. An apparatus as in claim 3:
   a closable opening in said liner adjacent said spring, whereby the spring may be manually depressed out of engagement, and whereby the spring location may be inspected.

5. An apparatus as in claim 3, comprising also:
   a spring travel retainer located on said impingement plate and limiting movement of said spring in a direction away from said impingement plate.

* * * * *